US010024515B2

(12) United States Patent
Min et al.

(10) Patent No.: US 10,024,515 B2
(45) **Date of Patent: *Jul. 17, 2018**

(54) LIGHTING DEVICE HAVING SEPARABLE LIGHT SOURCE AND CIRCUITRY

(71) Applicant: LG INNOTEK CO., LTD., Seoul (KR)

(72) Inventors: Byeong Guk Min, Seoul (KR); Jae O Kwak, Seoul (KR); In Soo Park, Seoul (KR); Seung Kyun Hong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 195 days.

This patent is subject to a terminal disclaimer.

(21) Appl. No.: 14/812,640

(22) Filed: Jul. 29, 2015

(65) Prior Publication Data

US 2015/0330621 A1 Nov. 19, 2015

Related U.S. Application Data

(63) Continuation of application No. 13/583,498, filed as application No. PCT/KR2012/006764 on Aug. 24, 2012, now Pat. No. 9,127,817.

(30) Foreign Application Priority Data

Aug. 26, 2011 (KR) ........................ 10-2011-0085481
Nov. 11, 2011 (KR) ........................ 10-2011-0117253
Nov. 11, 2011 (KR) ........................ 10-2011-0117254

(51) Int. Cl.
*F21S 13/10* (2006.01)
*F21V 3/00* (2015.01)
(Continued)

(52) U.S. Cl.
CPC .................. *F21V 3/00* (2013.01); *F21K 9/23* (2016.08); *F21K 9/238* (2016.08); *F21V 17/108* (2013.01);
(Continued)

(58) Field of Classification Search
CPC . F21V 3/00; F21V 3/006; F21V 3/004; F21V 17/108; F21V 17/005; F21V 17/12;
(Continued)

(56) References Cited

U.S. PATENT DOCUMENTS 2,477,901 A 8/1949 Robboy
7,748,886 B2 * 7/2010 Pazula .................. H01R 33/94
362/353

(Continued)

FOREIGN PATENT DOCUMENTS

CN 101680613 A 3/2010
CN 101828069 A 9/2010

(Continued)

OTHER PUBLICATIONS

Japanese Office Action for Application 2014-527078 dated Jun. 7, 2016 (full Japanese text and English translation).

(Continued)

*Primary Examiner* — Erin Kryukova
(74) *Attorney, Agent, or Firm* — KED & Associates, LLP

(57) ABSTRACT

A lighting device may be provided that comprises: a cover; a member comprising a first placement portion, a second placement portion and a guide disposed between the first placement portion and the second placement portion; a light source module disposed on the first placement portion; a heat sink comprising a first receiver and a second receiver, the first receiver being defined by a flat surface and a plurality of heat radiating fins extending from an edge portion of the flat surface; and a circuitry disposed in the second receiver; wherein the second placement portion is disposed in the first receiver, wherein a first portion of the guide is couple to the cover and a second portion of the guide is couple to the heat radiating fins of the heat sink, and wherein the guide is spaced apart from the flat surface, the (Continued)

guide contacts the heat radiating fins, and the guide is disposed on the heat radiating fins.

20 Claims, 11 Drawing Sheets

(51) Int. Cl.
*F21V 15/00* (2015.01)
*B60Q 1/06* (2006.01)
*F21V 29/00* (2015.01)
*F21V 5/00* (2015.01)
*F21V 23/00* (2015.01)
*F21V 29/87* (2015.01)
*F21V 17/10* (2006.01)
*F21V 29/77* (2015.01)
*F21K 9/23* (2016.01)
*F21K 9/238* (2016.01)
*F21Y 115/10* (2016.01)

(52) U.S. Cl.
CPC .......... *F21V 23/004* (2013.01); *F21V 23/006* (2013.01); *F21V 29/773* (2015.01); *F21V 29/87* (2015.01); *F21Y 2115/10* (2016.08)

(58) Field of Classification Search
CPC .......... F21V 17/14; F21V 17/18; F21V 29/87; F21V 29/773; F21V 29/002; F21V 29/004; F21V 29/10; F21V 29/70; F21V 29/71; F21V 29/713; F21V 23/006; F21V 23/004; F21K 9/238; F21K 9/23; F21K 9/232; F21K 9/90; F21K 9/237; F21Y 2115/10; H05K 2203/1327
USPC .................................................. 362/373, 363
See application file for complete search history.

(56) References Cited

U.S. PATENT DOCUMENTS

| | | | |
|---|---|---|---|
| 7,866,850 B2 | 1/2011 | Alexander et al. | |
| 8,193,688 B2 * | 6/2012 | Chin | F21V 3/00<br>313/11 |
| 8,222,820 B2 | 7/2012 | Wang et al. | |
| 8,267,570 B2 * | 9/2012 | Lai | H01R 33/96<br>362/651 |
| 8,328,394 B2 * | 12/2012 | Lu | F21V 29/763<br>313/498 |
| 2006/0232974 A1 * | 10/2006 | Lee | F21V 3/00<br>362/294 |
| 2006/0262545 A1 | 11/2006 | Piepgras et al. | |
| 2007/0236935 A1 * | 10/2007 | Wang | F21K 9/00<br>362/294 |
| 2009/0045715 A1 * | 2/2009 | Shantha | H01J 5/54<br>313/51 |
| 2009/0213595 A1 | 8/2009 | Alexander et al. | |
| 2010/0026157 A1 * | 2/2010 | Tanaka | F21V 19/0055<br>313/45 |
| 2010/0072894 A1 * | 3/2010 | Shibahara | F21V 29/004<br>315/32 |
| 2010/0096992 A1 | 4/2010 | Yamamoto et al. | |
| 2010/0225220 A1 * | 9/2010 | Tanaka | F21V 31/005<br>313/46 |
| 2010/0301748 A1 * | 12/2010 | Sakai | H05B 33/08<br>315/50 |
| 2011/0049749 A1 | 3/2011 | Bailey et al. | |
| 2011/0063842 A1 * | 3/2011 | Takei | F21V 19/004<br>362/249.01 |
| 2011/0068342 A1 | 3/2011 | Takai et al. | |
| 2011/0133652 A1 | 6/2011 | Chen | |
| 2011/0309751 A1 * | 12/2011 | Ter-Hovhannisyan | F21V 29/004<br>315/113 |
| 2012/0025706 A1 * | 2/2012 | Wang | F21V 17/14<br>315/35 |
| 2012/0195043 A1 * | 8/2012 | Watanabe | F21V 29/004<br>362/249.02 |
| 2013/0039071 A1 * | 2/2013 | Wang | F21V 3/00<br>362/294 |
| 2013/0044500 A1 | 2/2013 | Reingruber | |
| 2013/0070464 A1 | 3/2013 | Shinohara et al. | |

FOREIGN PATENT DOCUMENTS

| | | | |
|---|---|---|---|
| CN | 201731336 | | 2/2011 |
| CN | 201731336 | U | 2/2011 |
| DE | 10-2010-028481 | | 11/2011 |
| EP | 2 149 742 | | 7/2009 |
| EP | 2 163 808 | | 3/2010 |
| FR | 2 938 047 | A1 | 5/2010 |
| JP | 2000-340279 | | 12/2000 |
| JP | 2006-093044 | | 4/2006 |
| JP | 2006-313718 | A | 11/2006 |
| JP | 2007-265892 | A | 10/2007 |
| JP | 2009-004130 | A | 1/2009 |
| JP | 2009-037995 | | 2/2009 |
| JP | 2009-206104 | A | 9/2009 |
| JP | 2010-61852 | A | 3/2010 |
| JP | 2011-513922 | | 4/2011 |
| JP | 2011-228184 | | 11/2011 |
| KR | 10-0759054 | B1 | 9/2007 |
| KR | 10-0908136 | B1 | 7/2009 |
| KR | 20-2010-0007038 | U | 7/2010 |
| WO | WO 2008/146694 | | 12/2008 |
| WO | WO 2009/091133 | | 7/2009 |

OTHER PUBLICATIONS

Korean Office Action dated Dec. 17, 2012 issued in Application No. 10-2011-0085481.
Korean Office Action dated Jan. 21, 2013 issued in Application No. 10-2011-0117253.
U.S. Office Action for U.S. Appl. No. 13/583,498 dated Jun. 27, 2014.
European Search Report issued in Application No. 12827351.3 dated Dec. 12, 2014.
U.S. Office Action for U.S. Appl. No. 13/583,498 dated Jan. 5, 2015.
Chinese Office Action for Application 201280041615.8 dated Feb. 28, 2015 and English language translation.
Japanese Office Action dated Mar. 7, 2017 issued in Application No. 2014-527078.
European Search Report dated Apr. 7, 2017 issued in Application No. 16204859.9.

* cited by examiner

LIGHTING DEVICE HAVING SEPARABLE LIGHT SOURCE AND CIRCUITRY

CROSS-REFERENCE TO RELATED APPLICATIONS

The present application is a Continuation Application of U.S. application Ser. No. 13/583,498 filled Sep. 7, 2012, which claims priority from PCT Application No. PCT/KR2012/006764 filed Aug. 24, 2012, which claims priority to Korean Patent Application No. 10-2011-0085481, filed Aug. 26, 2011, No. 10-2011-0117253, filed Nov. 11, 2011 and No. 10-2011-0117254, filed Nov. 11, 2011, the entireties of which are incorporated herein by reference.

BACKGROUND

Technical Field

This embodiment relates to a lighting device.

Background Art

A light emitting diode (LED) is a semiconductor element for converting electric energy into light. As compared with existing light sources such as a fluorescent lamp and an incandescent electric lamp and so on, the LED has advantages of low power consumption, a semi-permanent span of life, a rapid response speed, safety and an environment-friendliness. For this reason, many researches are devoted to substitution of the existing light sources with the LED. The LED is now increasingly used as a light source for lighting devices, for example, various lamps used interiorly and exteriorly, a liquid crystal display device, an electric sign and a street lamp and the like.

Technical Problem

The objective of the present invention is to provide a lighting device including a light source and a circuitry which are separable from each other.

The objective of the present invention is to provide a lighting device of which the lifespan does not depend on the circuitry.

The objective of the present invention is to provide a lighting device of any damaged one out of the light source and circuitry can be freely replaced.

The objective of the present invention is to provide a lighting device of which the light source and circuitry can be independently produced and sold.

The objective of the present invention is to provide a lighting device capable both of remarkably reducing defects caused by the destruction of a tap when a bolt is fastened to conventional power supply unit (PSU) housings of MR, PAR and a general bulb product and of remarkably reducing defects caused by crack.

The objective of the present invention is to provide a lighting device capable of both reducing a manufacturing cost and an assembly lead time by removing parts.

The objective of the present invention is to provide a lighting device capable of maintaining security for the design structure of the PSU housing because the PSU housing is fastened within a heat sink by a hook and is difficult to analyze.

The objective of the present invention is to provide a lighting device which includes an inlet for injecting molding liquid to an inner case and causes the molding liquid to be injected into only heat generating parts, so that a manufacturing cost is reduced.

While in the past a rubber cover is inevitably added in order to prevent water from leaking at the time of injecting the molding liquid, the objective of the present invention is to provide a lighting device which cures the molding liquid by using the rubber cover as JIG and removes the rubber cover, so that a manufacturing cost is reduced by removing parts.

Technical Solution

One embodiment is a lighting device. The lighting device includes: a light source including: a member which includes a first placement portion and a second placement portion; a light source module which is disposed in the first placement portion; and a first terminal which is disposed in the second placement portion and is electrically connected to the light source module; and a heat sink including: a first receiver in which the second placement portion of the member is disposed; a second receiver in which a circuitry is disposed; and a second terminal which is disposed corresponding to the first terminal of the light source.

The second placement portion of the member has a screw thread. The heat sink has a screw groove corresponding to the screw thread.

The member has a catching projection. The heat sink has a catching groove which is coupled to the catching projection.

The catching projection is disposed on the second placement portion of the member. The catching groove has an "L"-shape.

The second placement portion of the light source includes an insulating portion surrounding the first terminal. The insulating portion prevents electrical short-cut between the first terminal and the member.

The heat sink includes an insulating portion surrounding the second terminal. The insulating portion prevents electrical short-cut between the second terminal and the heat sink.

The light source module includes a substrate and a light emitting device disposed on the substrate. The member has a cavity in which the substrate is disposed.

The lighting device further includes a cover which is disposed over the light source module and is coupled to the member.

The member further includes a guide disposed between the cover and the heat sink.

The first terminal and the second terminal include a circular first electrode and a second electrode surrounding the first electrode, respectively.

Another embodiment is a lighting device. The lighting device includes: a light source module; a heat sink in which the light source module is disposed and which has a receiver and an insertion recess disposed in the inner surface thereof defining the receiver; an inner case which is disposed in the receiver of the heat sink and has a hook coupled to the insertion recess; and a circuitry which is disposed within the inner case and supplies electric power to the light source module.

The hook is disposed on both sides of the outer surface of the inner case respectively.

The inner case has an opening. The hook extends toward the opening and projects in such a manner that the end of the hook is inclined.

The inner case includes: a cylindrical receiver; a connection portion disposed under the receiver in such a manner as to have a diameter less than that of the receiver; and a level-difference portion connecting the receiver with the connection portion.

The inner case has a guide projection disposed on the outer surface of the receiver in the longitudinal direction of the receiver. The heat sink has a guide groove disposed at a position corresponding to the position of the guide projection.

The inner case has a guide groove disposed on the outer surface of the receiver in the longitudinal direction of the receiver. The heat sink has a guide projection disposed at a position corresponding to the position of the guide groove.

Further another embodiment is a lighting device. The lighting device includes: a light source module; a heat sink in which the light source module is disposed and which has a receiver; an inner case which is disposed in the receiver of the heat sink and has at least one inlet for injecting molding liquid; and a circuitry which is disposed within the inner case and supplies electric power to the light source module.

The inner case includes: a cylindrical receiver; a connection portion disposed under the receiver in such a manner as to have a diameter less than that of the receiver; and an inclined portion connecting the receiver with the connection portion and having an inlet is disposed therein.

The inlet is sealed with silicone or resin material.

The heat sink has an insertion recess. The inner case has a hook coupled to the insertion recess.

Advantageous Effects

In a lighting device according to the embodiment, a light source and a circuitry of the lighting device can be separated from each other.

In the lighting device according to the embodiment, the lifespan of the lighting device does not depend on the circuitry.

In the lighting device according to the embodiment, any damaged one out of the light source and circuitry can be freely replaced.

In the lighting device according to the embodiment, the light source and circuitry can be independently produced and sold.

In the lighting device according to the embodiment, it is possible both to remarkably reduce defects caused by the destruction of a tap when a bolt is fastened to conventional PSU housings of MR, PAR and a general bulb product and to remarkably reduce defects caused by crack.

In the lighting device according to the embodiment, it is possible to reduce a manufacturing cost and an assembly lead time by removing parts.

In the lighting device according to the embodiment, it is possible to maintain security for the design structure of the PSU housing because the PSU housing is fastened within a heat sink by a hook and is difficult to analyze.

In the lighting device according to the embodiment, an inlet for injecting molding liquid into an inner case is formed and causes the molding liquid to be injected into only heat generating parts, so that a manufacturing cost is reduced.

While in the past a rubber cover is inevitably added in order to prevent water from leaking at the time of injecting the molding liquid, the lighting device according to the embodiment cures the molding liquid by using the rubber cover as JIG and removes the rubber cover, so that a manufacturing cost is reduced by removing parts.

DETAILED DESCRIPTION

A thickness or size of each layer is magnified, omitted or schematically shown for the purpose of convenience and clearness of description. The size of each component does not necessarily mean its actual size.

In description of embodiments of the present invention, when it is mentioned that an element is formed "on" or "under" another element, it means that the mention includes a case where two elements are formed directly contacting with each other or are formed such that at least one separate element is interposed between the two elements. The "on" and "under" will be described to include the upward and downward directions based on one element.

A lighting device according to various embodiments will be described with reference to the accompanying drawings.

First Embodiment

Figure 1:
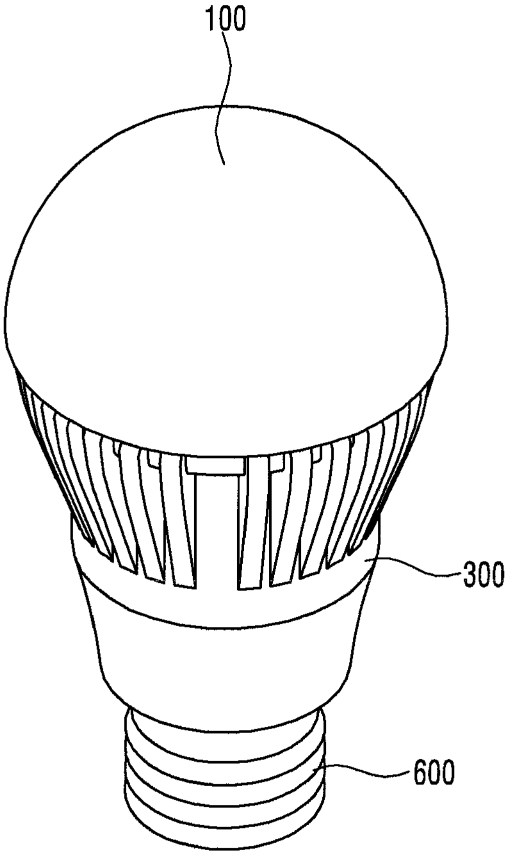
FIG. 1 is a perspective view of a lighting device according to a first embodiment.
Figure 2:
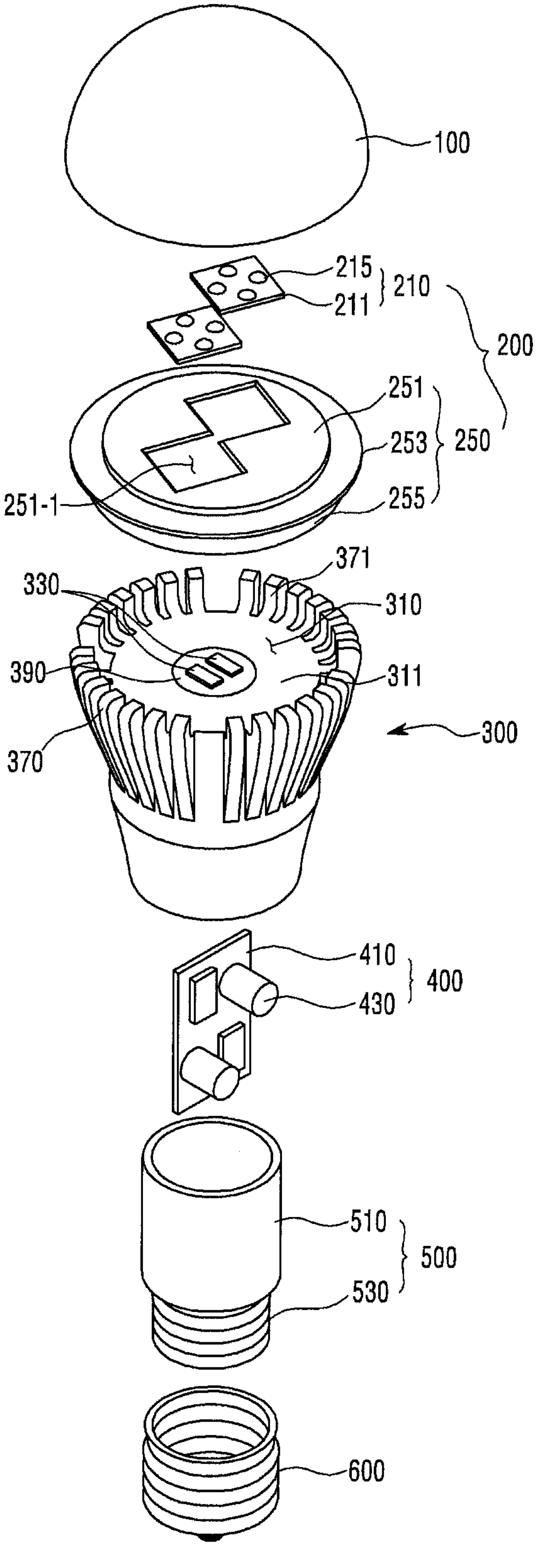
FIG. 2 is an exploded perspective view of the lighting device shown in FIG. 1.
Figure 3:
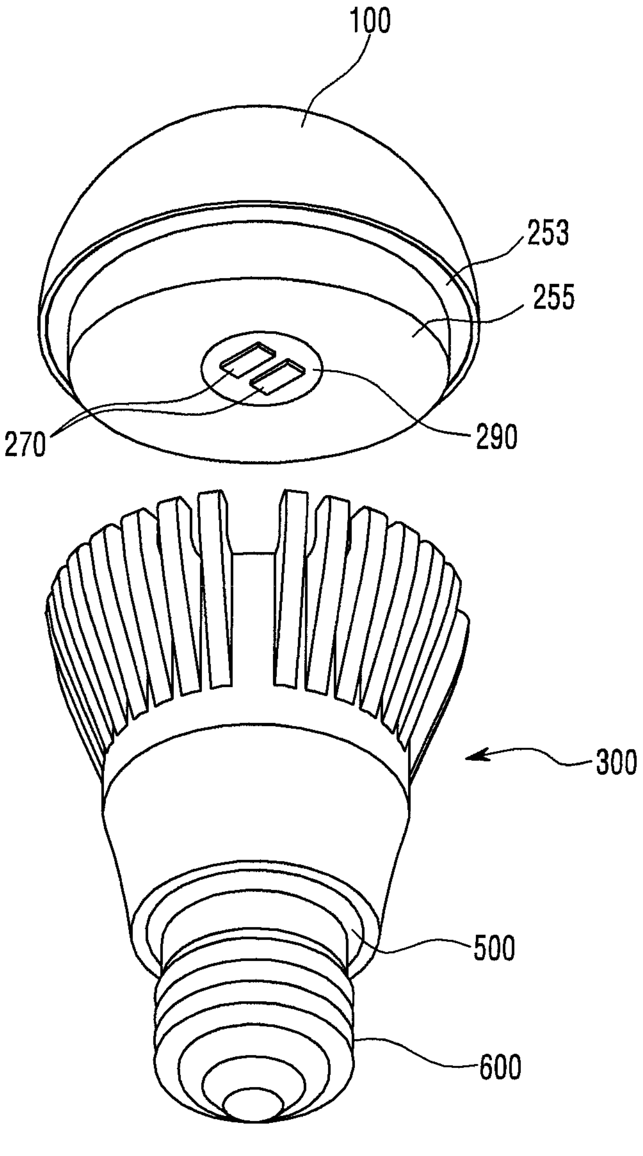
FIG. 3 is a perspective view showing that a light source and a circuitry of the lighting device shown in FIG. 1 are separated from each other.
Figure 4:
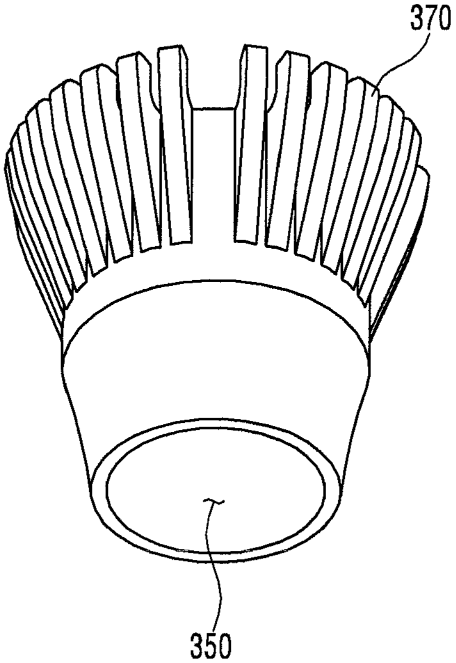
FIG. 4 is a bottom perspective view of a heat sink shown in FIG. 2.

FIG. 1 is a perspective view of a lighting device according to a first embodiment. FIG. 2 is an exploded perspective view of the lighting device shown in FIG. 1. FIG. 3 is a perspective view showing that a light source and a circuitry of the lighting device shown in FIG. 1 are separated from each other. FIG. 4 is a bottom perspective view of a heat sink shown in FIG. 2.

Referring to FIGS. 1 to 4, the lighting device according to the first embodiment may include a cover 100, a light source 200, a heat sink 300, a circuitry 400, an inner case 500 and a socket 600. Hereafter, the components will be described in detail respectively.

The cover 100 has a bulb shape or a hemispherical shape. The cover 100 has an empty space and a partial opening.

The cover 100 is coupled to the light source 200. Specifically, the cover 100 may be coupled to a member 250 of the light source 200. The cover 100 may be coupled to the member 250 by using an adhesive or various methods, for example, bolt-fastening, rotary coupling, hook coupling and the like. In the bolt-fastening method, the cover 100 and the member 250 are coupled to each other by using a bolt. In the rotary coupling method, the screw thread of the cover 100 is coupled to the screw groove of the member 250. That is, the cover 100 and the member 250 are coupled to each other by the rotation of the cover 100. In the hook coupling method, the cover 100 and the member 250 are coupled to each other by inserting and fixing the hook (for example, a protrusion, a projection and the like) of the cover 100 into the groove of the member 250.

The cover 100 is optically coupled to the light source 200. Specifically, the cover 100 may diffuse, scatter or excite light emitted from the light source 200. Here, the inner/outer surface or the inside of the cover 100 may include a fluorescent material so as to excite the light emitted from the light source 200.

The inner surface of the cover 100 may be coated with an opalescent pigment. Here, the opalescent pigment may include a diffusing agent diffusing the light. The roughness of the inner surface of the cover 100 may be larger than that of the outer surface of the cover 100. This intends to sufficiently scatter and diffuse the light emitted from the light source 200.

The cover 100 may be formed of glass, plastic, polypropylene (PP), polyethylene (PE), polycarbonate (PC) and the like. Here, the polycarbonate (PC) has excellent light resistance, thermal resistance and rigidity.

The cover 100 may be formed of a transparent material causing the light source 200 to be visible to the outside or may be formed of an opaque material causing the light source 200 not to be visible to the outside.

The cover 100 may be formed by a blow molding process.

The light source 200 may include at least one light source module 210 and the member 250.

The light source module 210 is disposed on the member 250 in such a manner as to emit light to the inner surface of the cover 100. The member 250 may be coupled to the heat sink 300. The member 250 coupled to the heat sink 300 is able to electrically connect the light source module 210 with the circuitry 400. Hereafter, the light source module 210 and the circuitry 400 will be described in detail.

The light source module 210 includes a substrate 211 and at least one light emitting device 215. The light emitting device 215 is disposed on one side of the substrate 211. As shown in the drawing, the two light source modules 210 may be provided. Otherwise, one or more than three light source modules 210 may be provided.

The substrate 211 may be disposed on the member 250.

The substrate 211 may have a quadrangular plate shape. However, the substrate 211 may have various shapes without being limited to this. For example, the substrate 211 may have a circular plate shape or a polygonal plate shape. The substrate 211 may be formed by printing a circuit pattern on an insulator. For example, the substrate 211 may include a common printed circuit board (PCB), a metal core PCB, a flexible PCB, a ceramic PCB and the like. Also, the substrate 211 may include a chips on board (COB) allowing an unpackaged LED chip to be directly bonded to a printed circuit board. The substrate 211 may be formed of a material capable of efficiently reflecting light. The surface of the substrate 211 may have a color such as white, silver and the like capable of efficiently reflecting light.

The surface of the substrate 211 may be coated with a material capable of efficiently reflecting light. The surface of the substrate 211 may be coated with a color capable of efficiently reflecting light, for example, white, silver and the like.

The light emitting device 215 may be a light emitting diode chip emitting red, green and blue light or a light emitting diode chip emitting UV. Here, the light emitting diode chip may have a lateral type or vertical type and may emit blue, red, yellow or green light.

The light emitting device 215 may have a fluorescent material. The fluorescent material may include at least any one selected from a group consisting of a garnet material (YAG, TAG), a silicate material, a nitride material and an oxynitride material. Otherwise, the fluorescent material may include at least any one selected from a group consisting of a yellow fluorescent material, a green fluorescent material and a red fluorescent material.

The member 250 may include a first placement portion 251, a guide 253 and a second placement portion 255. Here, the first placement portion 251 may be the top surface of the member 250. The second placement portion 255 may be the bottom surface of the member 250. The first placement portion 251 and the second placement portion 255 may be separated by the guide 253.

The light source module 210 is disposed in the first placement portion 251. Specifically, the substrate 211 of the light source module 210 may be disposed in the first placement portion 251. The first placement portion 251 may have a cavity 251-1 into which the substrate 211 may be inserted. The depth of the cavity 251-1 may be the same as the thickness of the substrate 211. A plurality of the cavities 251-1 may be provided according to the number of the substrates 211.

As shown in FIG. 3, a first terminal 270 is disposed in the second placement portion 255. The first terminal 270 is a conductor through which electricity flows.

The first terminal 270 may include a positive (+) electrode and a negative (−) electrode. Here, the positive (+) electrode and the negative (−) electrode are disposed apart from each other. The positive (+) electrode is connected to the positive (+) electrode of a second terminal 330. The negative (−) electrode is connected to the negative (−) electrode of the second terminal 330.

The first terminal 270 is electrically connected to the light source module 210 disposed in the first placement portion 251. The first terminal 270 may be electrically connected to the light source module 210 by using a wire. That is, one end of a wire may be connected to the first terminal 270. The other end of the wire may be connected to the substrate 211 of the light source module 210.

The first terminal 270 may be electrically connected to the light source module 210 by the first terminal 270 itself, That is, one end of the first terminal 270 may be connected to the substrate 211 of the light source module 210. The other end of the first terminal 270 may be disposed in the second placement portion 255.

The first terminal 270 directly contacts with the second terminal 330 of the heat sink 300. Due to the direct contact between the first terminal 270 and the second terminal 330, the first terminal 270 and the second terminal 330 may be electrically connected to each other.

The guide 253 is disposed between the cover 100 and the heat sink 300. The upper portion of the guide 253 is coupled to the cover 100. The lower portion of the guide 253 is coupled to heat radiating fins 370 of the heat sink 300. The first placement portion 251 and the second placement portion 255 may be separated by the guide 253.

The second placement portion 255 may be received in a first receiver 310 of the heat sink 300. When the second placement portion 255 is received in the first receiver 310, the first terminal 270 mechanically contacts with the second terminal 330, and then the first terminal 270 and the second terminal 330 can be electrically connected to each other.

The member 250 may be formed of a material having thermal conductivity. This intends that the member 250 rapidly receives heat generated from the light source module 210 and protects the light source module 210 from the heat. The member 250 may be formed of, for example, Al, Ni, Cu, Mg, Ag, Sn and the like and an alloy including the metallic materials. The member 250 may be also formed of thermally conductive plastic. The thermally conductive plastic is lighter than a metallic material and has a unidirectional thermal conductivity.

The member 250 may include an insulating portion 290. When the member 250 is made of a metallic material through which electricity flows, since the first terminal 270 is also a conductor, electrical short-cut may occur between the member 250 and the first terminal 270. The insulating portion 290 prevents the electrical short-cut. The insulating portion 290 may be disposed in the second placement portion 255 of the member 250 in such a manner as to surround the first terminal 270.

The heat sink 300 receives the heat from the light source 200 and the circuitry 400 and radiates the heat. The heat sink 300 may be formed of Al, Ni, Cu, Mg, Ag, Sn and the like and an alloy including the metallic materials. The heat sink 300 may be also formed of thermally conductive plastic. The thermally conductive plastic is lighter than a metallic material and has a unidirectional thermal conductivity.

The heat sink 300 may have the first receiver 310 and a second receiver 350.

The first receiver 310 may be formed by the heat radiating fins 370 and one side of the heat sink 300. Specifically, the first receiver 310 may be determined by one side 311 of the heat sink 300 and one side 371 of the heat radiating fin 370. Here, the one side 311 of the heat sink 300 and the one side 371 of the heat radiating fin 370 may be inclined with respect to each other or may be substantially perpendicular to each other.

The first receiver 310 receives the second placement portion 255 of the member 250. In this case, since the second placement portion 255 directly contacts with the one side 311 of the first receiver 310 and the one side 371 of the heat radiating fin 370, the heat from the member 250 may be directly transferred to the heat sink 300 and the heat radiating fins 370.

The second terminal 330 is disposed in the first receiver 310. The second terminal 330 is disposed on the one side 311 of the heat sink 300. The second terminal 330 is a conductor and directly contacts with the first terminal 270 of the member 250. Therefore, the second terminal 330 is electrically connected to the first terminal 270.

Like the first terminal 270, the second terminal 330 may include a positive (+) electrode and a negative (−) electrode. The positive (+) electrode and the negative (−) electrode are disposed apart from each other. The positive (+) electrode is connected to the positive (+) electrode of the first terminal 270. The negative (−) electrode is connected to the negative (−) electrode of the first terminal 270.

The second receiver 350 is disposed corresponding to the first receiver 310 of the heat sink 300. The first receiver 310 is disposed on the second receiver 350. Contrarily, the second receiver 350 is disposed under the first receiver 310.

The second receiver 350 may be a cavity formed in the other side of the heat sink 300. The second receiver 350 has a predetermined depth in the direction of the first receiver 310. The depth of the second receiver 350 may be greater than that of the first receiver 310. The depth of the second receiver 350 may be changed according to the size of the circuitry 400.

The second receiver 350 receives the circuitry 400 and the inner case 500. Specifically, the inner case 500 receives the circuitry 400, and then the second receiver 350 receives the inner case 500.

The heat sink 300 may have the heat radiating fins 370. The heat radiating fins 370 may extend from or may be connected to the outer surface of the heat sink 300. The heat radiating fins 370 increase the heat radiating area of the heat sink 300, thereby improving heat radiation efficiency.

The one side 371 of the heat radiating fin 370, together with the one side 311 of the heat sink 300 can determine the first receiver 310.

The guide 253 of the member 250 is disposed on the heat radiating fins 370. The heat radiating fins 370 are able to directly receive heat from the guide 253.

The heat sink 300 may include an insulating portion 390. When the heat sink 300 is made of a metallic material through which electricity flows, since the second terminal 330 is also a conductor, electrical short-cut may occur between the heat sink 300 and the second terminal 330. The insulating portion 390 prevents the electrical short-cut. The insulating portion 390 may be disposed on the one side 311 of the heat sink 300 in such a manner as to surround the second terminal 330.

The circuitry 400 receives external electric power, and then converts the received electric power in accordance with the light source module 210 of the light source 200. The circuitry 400 supplies the converted electric power to the light source 200.

The circuitry 400 is received in the heat sink 300. Specifically, the circuitry 400 is received in the inner case 500, and then, together with the inner case 500, is received in the second receiver 350 of the heat sink 300.

The circuitry 400 may include a circuit board 410 and a plurality of parts 430 mounted on the circuit board 410.

The circuit board 410 may have a quadrangular plate shape. However, the circuit board 410 may have various shapes without being limited to this. For example, the circuit board 410 may have an elliptical plate shape or a circular plate shape. The circuit board 410 may be formed by printing a circuit pattern on an insulator. The circuit board 410 may include a metal core PCB, a flexible PCB, a ceramic PCB and the like.

The circuit board 410 is electrically connected to the second terminal 330 of the heat sink 300. The circuit board 410 may be electrically connected to the second terminal 330 by using a wire. That is, one end of a wire may be connected to the second terminal 330. The other end of the wire may be connected to the circuit board 410.

The circuit board 410 may be electrically connected to the second terminal 330 by the second terminal 330 itself. That is, one end of the second terminal 330 may be directly connected to the circuit board 410. The other end of the second terminal 330 may be, as shown in FIG. 2, disposed on the one side 311 of the heat sink 300.

The plurality of parts 430 may include, for example, a Converter converting AC power supply supplied by an external power supply into DC power supply, a driving chip controlling the driving of the light source module 210, and an electrostatic discharge (ESD) protective device for protecting the light source module 210.

The inner case 500 receives the circuitry 400 thereinside. The inner case 500 may have a receiver 510 for receiving the circuitry 400. The receiver 510 may have a cylindrical shape. The shape of the receiver 510 may be changed according to the shape of the second receiver 350 of the heat sink 300.

The inner case 500 is received in the heat sink 300. The receiver 510 of the inner case 500 is received in the second receiver 350 of the heat sink 300.

The inner case 500 is coupled to the socket 600. The inner case 500 may include a connection portion 530 which is coupled to the socket 600. The connection portion 530 may have a screw thread corresponding to the screw groove of the socket 600. The diameter of the connection portion 530 may be less than that of the receiver 510.

The inner case 500 is a nonconductor. Therefore, the inner case 500 prevents electrical short-cut between the circuitry 400 and the heat sink 300. The inner case 500 may be made of a plastic or resin material.

The socket 600 is coupled to the inner case 500. Specifically, the socket 600 is coupled to the connection portion 530 of the inner case 500.

The socket 600 may have the same structure as that of a conventional incandescent bulb. The circuitry 400 is electrically connected to the socket 600. The circuitry 400 may be electrically connected to the socket 600 by using a wire. Therefore, when external electric power is applied to the socket 600, the external electric power may be transmitted to the circuitry 400.

The socket 600 may have a screw groove corresponding to the screw thread of the connection portion 530.

Figure 5:
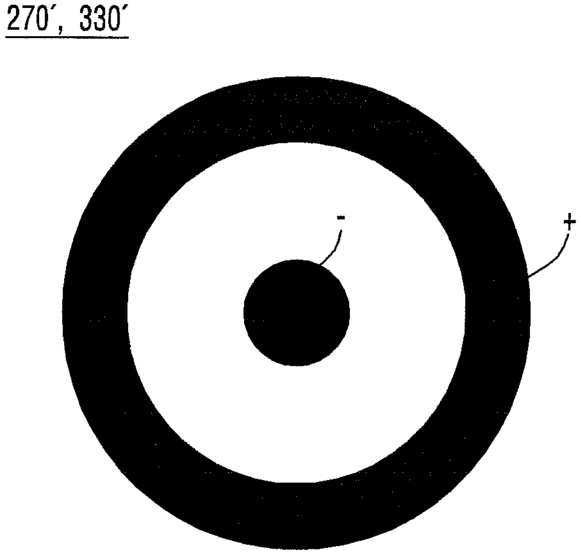
FIG. 5 is a view showing modified examples of a first terminal and a second terminal, each of which is shown in FIGS. 2 and 3 respectively.

FIG. 5 is a view showing modified examples of the first terminal and the second terminal, each of which is shown in FIGS. 2 and 3 respectively.

Terminals 270' and 330' shown in FIG. 5 are modified examples of the second terminal 330 shown in FIG. 2 and the first terminal 270 shown in FIG. 3.

Referring to FIG. 5, each of the first and the second terminals 270' and 330' may include a circular negative (−) electrode and a positive (+) electrode surrounding the negative (−) electrode. Contrarily, each of the first and the second terminals 270' and 330' may include a circular positive (+) electrode and a negative (−) electrode surrounding the positive (+) electrode.

Though not shown separately in the drawing, the second terminal 330 shown in FIG. 2 and the first terminal 270 shown in FIG. 3 may have a shape which is inserted and fitted like a battery or may have a protruding shape which can be pushed inwardly.

Figure 6:
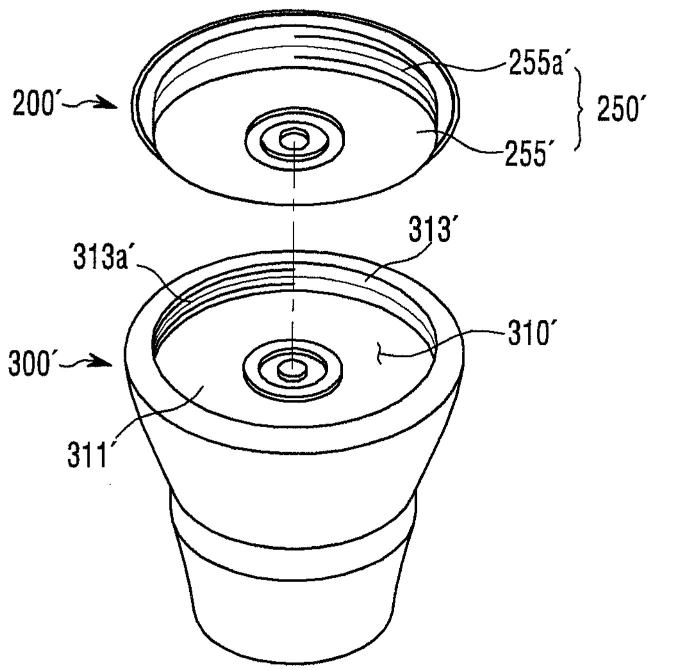
FIG. 6 is a perspective view showing a modified example of the lighting device shown in FIG. 2.

FIG. 6 is a perspective view showing a modified example of the lighting device shown in FIG. 2.

In description of the lighting device according to the modified example shown in FIG. 6, only differences between the lighting device shown in FIG. 6 and the lighting device shown in FIGS. 1 to 4 will be described.

A light source 200' has a screw thread **255*a*'. Specifically, the screw thread 255*a*' may be disposed on a second placement portion 255' of a member 250'. More specifically, the screw thread 255*a*' may be disposed on the lateral surface of the second placement portion 255'**.

The light source 200' includes the first terminal 270' shown in FIG. 5.

A heat sink 300' has a first receiver 310'. The first receiver 310' may be a cavity which is determined by the lateral surface 313' and bottom surface 311' of the heat sink 300'.

The heat sink 300' has a screw groove **313*a*'. The screw groove 313*a*' is coupled to the screw thread 255*a*' of the light source 200'. The screw groove 313*a*' may be disposed on the lateral surface 313' of the first receiver 310'**.

The heat sink 300' includes the second terminal 330' shown in FIG. 5. The second terminal 330' may be disposed on the bottom surface 311' of the heat sink 300'.

In the lighting device shown in FIG. 6, the light source 200' and the heat sink 300' can be easily coupled to or separated from each other by rotating them through the use of the screw thread **255*a*' and the screw groove 313*a*'. Also, since the lighting device shown in FIG. 6 includes the first and the second terminals 270' and 330' shown in FIG. 5, the light source 200' and the heat sink 300'** can be easily electrically connected to each other without distinguishing between the positive (+) electrode and the negative (−) electrode.

Figure 7:
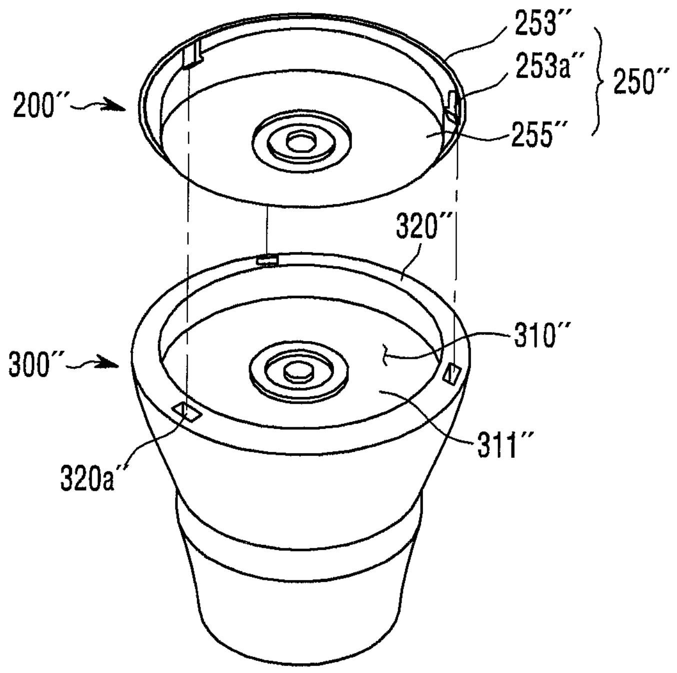
FIG. 7 is a view showing another modified example of the lighting device shown in FIG. 2.

FIG. 7 is a view showing another modified example of the lighting device shown in FIG. 2.

In description of the lighting device according to the another modified example shown in FIG. 7, only differences between the lighting device shown in FIG. 7 and the lighting device shown in FIGS. 1 to 4 will be described.

A light source 200" has a catching projection **253*a*". The catching projection 253*a*" may be disposed on a guide 253" of a member 250". Specifically, the catching projection 253*a*" may project from the guide 253" toward a heat sink 300"**.

The second placement portion 255" of the light source 200" includes the first terminal 270' shown in FIG. 5. However, the first terminal 270' may be the first terminal 270 shown in FIG. 3 without being limited to this.

The heat sink 300" has a tap 320". A first receiver 310" may be determined by the tap 320" and one side 311" of the heat sink 300".

The tap 320" has a catching groove **320*a*". The catching projection 253*a*" of the light source 200" is inserted into the catching groove 320*a*"**.

The number of the catching grooves **320*a*" may correspond to the number of the catching projections 253*a*"**.

The heat sink 300" includes the second terminal 330' shown in FIG. 5. However, the second terminal 330' may be the second terminal 330 shown in FIG. 2 without being limited to this.

In the lighting device shown in FIG. 7, the light source 200" and the heat sink 300" can be easily coupled to or separated from each other by using the catching projection **253*a*" and the catching groove 320*a*". Also, since the lighting device shown in FIG. 7 includes the first and the second terminals 270' and 330' shown in FIG. 5, the light source 200" and the heat sink 300"** can be easily electrically connected to each other without distinguishing between the positive (+) electrode and the negative (−) electrode.

Figure 8:
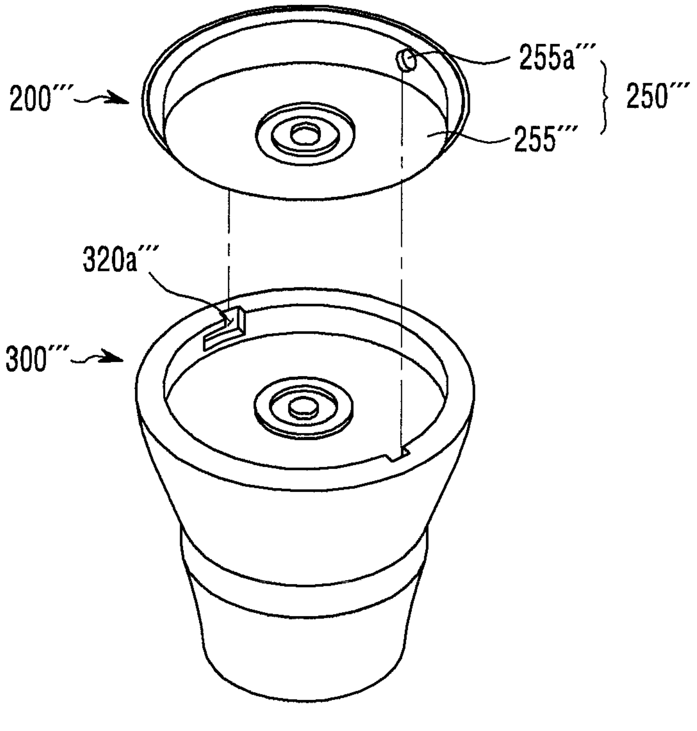
FIG. 8 is a view showing further another modified example of the lighting device shown in FIG. 2.

FIG. 8 is a view showing further another modified example of the lighting device shown in FIG. 2.

In description of the lighting device according to the further another modified example shown in FIG. 8, only differences between the lighting device shown in FIG. 8 and the lighting device shown in FIG. 7 will be described.

A light source 200''' has a catching projection 255*a'''*. The catching projection 255*a'''* may be disposed on a second placement portion 255''' of a member 250'. Specifically, the catching projection 255*a'''* may project from the lateral surface of the second placement portion 255'. Also, the catching projection 255*a'''* may project from the second placement portion 255''' perpendicularly to a direction in which the light source 200''' is coupled to a heat sink 300'''.

The light source 200' includes the first terminal 270' shown in FIG. 5. However, the first terminal 270' may be the first terminal 270 shown in FIG. 3 without being limited to this.

The heat sink 300''' has a catching groove 320*a'''*. The catching projection 255*a'''* is inserted into the catching groove 320*a'''*. The catching groove 320*a*'' may be bent in the form of "L". As the catching projection 255*a'''* moves along the "L"-shaped catching groove 320*a'''*, the light source 200''' may be coupled to the heat sink 300'''.

The number of the catching grooves 320*a'''* may correspond to the number of the catching projections 255*a'''*.

The heat sink 300''' includes the second terminal 330' shown in FIG. 5. However, the second terminal 330' may be the second terminal 330 shown in FIG. 2 without being limited to this.

In the lighting device shown in FIG. 8, the light source 200''' and the heat sink 300''' can be easily coupled to or separated from each other by using the catching projection 255*a*'' and the catching groove 320*a'''*. Also, since the lighting device shown in FIG. 8 includes the first and the second terminals 270' and 330' shown in FIG. 5, the light source 200''' and the heat sink 300' can be easily electrically connected to each other without distinguishing between the positive (+) electrode and the negative (−) electrode.

Second Embodiment

Figure 9:
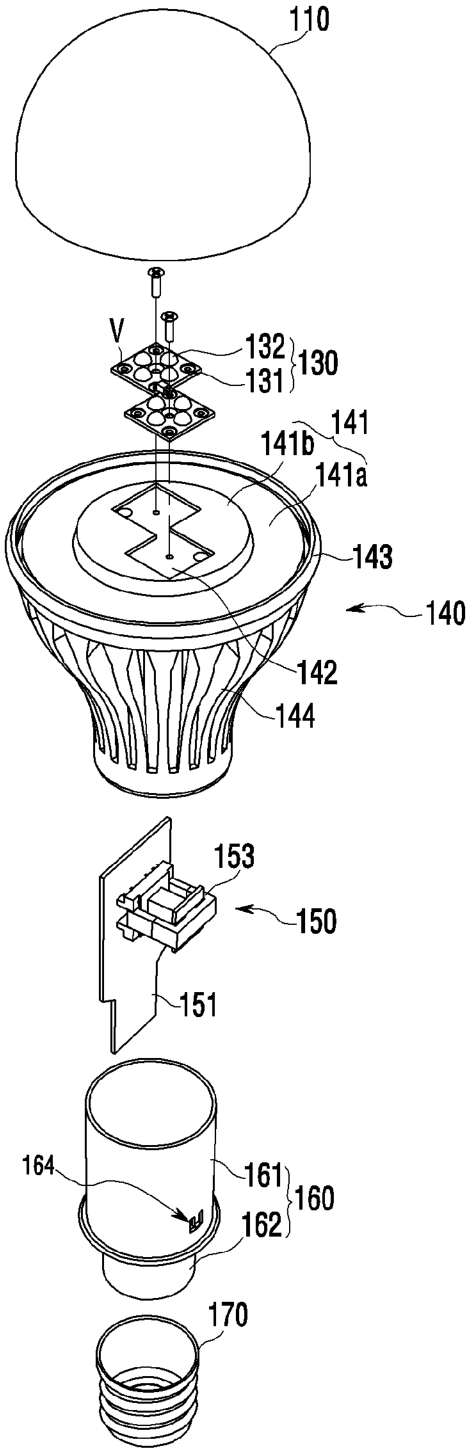
FIG. 9 is an exploded perspective view of a lighting device according to a second embodiment.

FIG. 9 is an exploded perspective view of a lighting device according to a second embodiment.

Referring to FIG. 9, the lighting device according to the second embodiment may include a cover 110, a light source module 130, a heat sink 140, a circuitry 150, an inner case 160 and a socket 170. In the lighting device according to the second embodiment, the heat sink 140 and the inner case 160 are coupled to each other by a hook coupling method.

The cover 110 is the same as the cover 100 shown in FIG. 1 except for the fact that the cover 110 is directly coupled to the heat sink 140. Therefore, the detailed descriptions of the same parts as those of the aforementioned embodiment will be omitted.

The light source module 130 is the same as the light source module 210 shown in FIG. 1 except for the fact that the light source module 130 is disposed on the heat sink 140. Specifically, the light source module 130 includes a substrate 131 and a light emitting device 132. The substrate 131 is the same as the substrate 211 shown in FIG. 1. The light emitting device 132 is the same as the light emitting device 215 shown in FIG. 1.

The heat sink 140 may be formed of Al, Ni, Cu, Mg, Ag, Sn and the like and an alloy including the metallic materials. The heat sink 140 may be also formed of thermally conductive plastic. The thermally conductive plastic is lighter than a metallic material and has a unidirectional thermal conductivity.

The heat sink 140 is able to improve heat radiation efficiency by coming in surface contact with the light source module 130. Here, the heat sink 140 and the light source module 130 may be coupled to each other to come in surface contact with each other by using a structure like a screw, or may be coupled to each other by using an adhesive.

The heat sink 140 has a flat portion 141 including a first base 141 *a* and a second base 141 *b*. Here, a level difference is formed between the first base 141 a and the second base 141*b*. Each of the first base 141 a and the second base 141*b* has a flat plate shape. The second base 141*b* has a seating portion 142 formed therein. The light source module 130 is installed in the seating portion 142. A guide 143 is formed on the upper circumference of the heat sink 140. A recess (not shown) into which the cover 110 is inserted is formed between the guide 143 and the first base 141*a*.

A plurality of heat radiating fins 144 are formed on the outer surface of the heat sink 140. The heat radiating fins 144 may extend from or may be connected to the outer surface of the heat sink 140. The heat radiating fins 144 increase the heat radiating area of the total heat sink 140, thereby improving heat radiation efficiency.

The lower inside of the heat sink 140 has a receiver for receiving the inner case 160. The receiver may be a predetermined space. The receiver may be a recess or a groove which has a predetermined depth.

An insertion recess (not shown, see reference numeral 147 of FIG. 10) is formed within a receiver of the inner case 160, that is, in the inner surface defining the receiver of the inner case 160. A hook (see reference numeral 164 of FIG. 11) of the inner case 160 is inserted into the insertion recess, so that the inner case 160 is fixed to the heat sink 140.

The inner case 160 is disposed within the lower portion of the heat sink 140 and is coupled to the socket 170. The circuitry 150 is received in the inner case 160. The circuitry 150 controls the power of the light source module 130 through the electrode terminal of the light source module 130.

Figure 11:
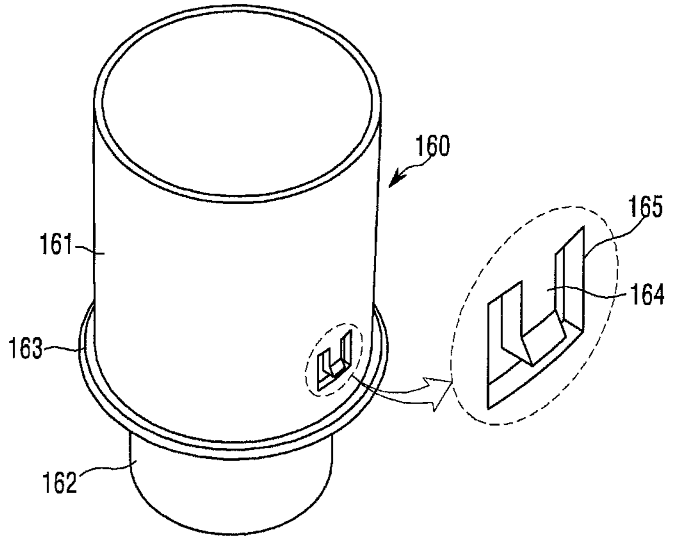
FIG. 11 is a perspective view showing only an inner case shown in FIG. 9.

As shown in FIG. 11, the inner case 160 includes the receiver 161, a connection portion 162 and a level-difference portion 163. The receiver 161 has a cylindrical shape. The connection portion 162 is formed under the receiver 161 in such a manner as to have a diameter less than that of the receiver 161. The level-difference portion 163 connects the receiver 161 with the connection portion 162.

The inner case 160 may include the hook 164. Specifically, the hook 164 may be formed on both sides of the outer surface of the receiver 161. When the inner case 160 is disposed within the lower portion of the heat sink 140, the hook 164 is coupled to the insertion recess (see reference numeral 147 of FIG. 10) formed within the heat sink 140.

Figure 12:
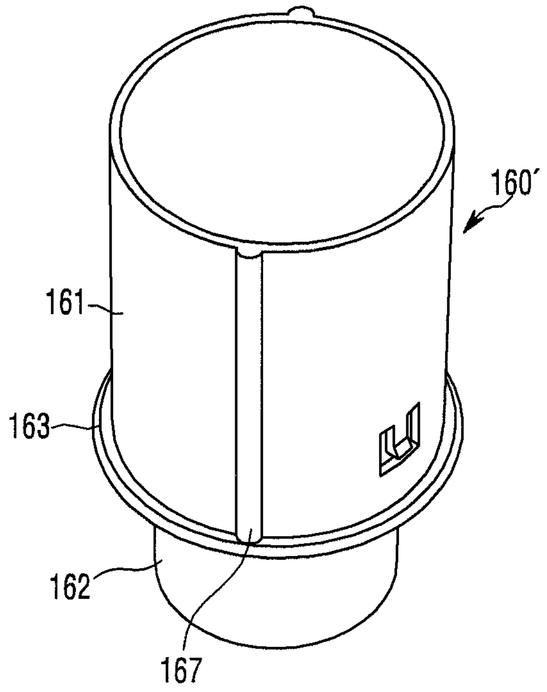
FIG. 12 is a perspective view showing a first modified example of the inner case shown in FIG. 11.
Figure 13:
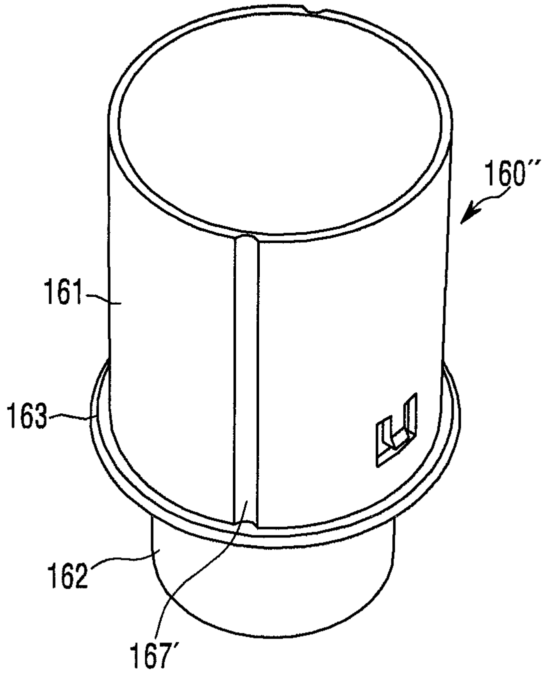
FIG. 13 is a perspective view showing a second modified example of the inner case shown in FIG. 11.

The inner case 160 may be variously changed as shown in FIGS. 11 to 13. Detailed descriptions of the modified examples of the inner case 160 will be provided in FIGS. 11 to 13.

The inner case 160 may be formed of a nonconductor in order to prevent electrical short-cut between the circuitry 150 and the heat sink 140. The inner case 160 may be made of a plastic or resin material.

The circuitry 150 receives electric power from the socket 170 coupled to the lower portion of the inner case 160 and supplies the electric power to the light source module 130.

The circuitry 150 converts the received electric power in accordance with the driving voltage of the light emitting module 130, and then supplies the converted electric power to the light source 130. For this purpose, the circuitry 150 includes a Converter 153 which is disposed on a substrate 151 and converts AC power supply supplied through the socket 170 into DC power supply, a driving chip which controls the driving of the light source module 130, and an electrostatic discharge (ESD) protective device for protecting the light source module 130.

The socket 170 is coupled to the inner case 160 and supplies electric power to the circuitry 150. The socket 170 functions to support the lighting device. Like a socket of an incandescent bulb, a screw thread and a screw groove are formed on the outer surface of the socket 170. The socket 170 is coupled to the inner case 160, and then is electrically connected to the circuitry 150. Here, the socket 170 may be connected to the circuitry 150 through a wire or may be directly connected to the circuitry 150.

In the lighting device according to the second embodiment, the hook 164 formed on both sides of the outer surface of the inner case 160 is coupled to the insertion recess formed within the heat sink 140. Accordingly, it is possible to overcome defects caused by the destruction of a tap when a bolt is fastened to conventional power supply unit (PSU) housings of MR and PAR products and to overcome defects caused by crack. Here, the PSU is designated to include the heat sink 140 and the inner case 160 receiving the circuitry 150 therewithin.

Third Embodiment

Figure 10:
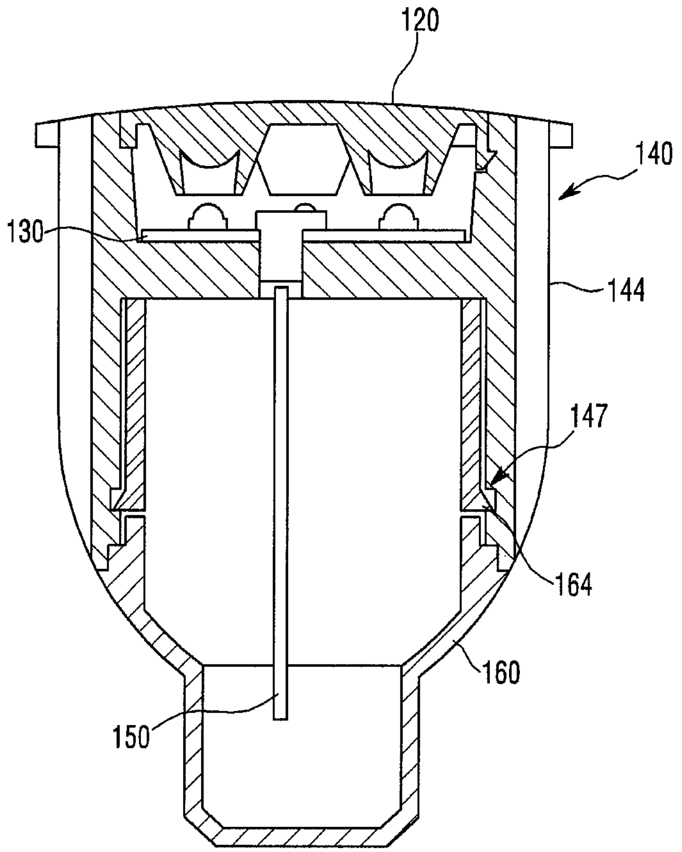
FIG. 10 is an inner cross sectional view of a lighting device according to a third embodiment.

FIG. 10 is an inner cross sectional view of a lighting device according to a third embodiment.

Like the lighting device according to the second embodiment shown in FIG. 9, in the lighting device according to the third embodiment shown in FIG. 10, when the inner case 160 is inserted into the inside of the lower portion of the heat sink 140, the hook 164 of the inner case 160 is coupled to the insertion recess 147 formed within the heat sink 140. However, the lighting device according to the third embodiment shown in FIG. 10 is different from the lighting device according to the second embodiment shown in FIG. 9 in that the light source module 130 is disposed within the upper portion of the heat sink 140, and a lens 120 is disposed on the light source module 130.

Here, an undescribed reference numeral 144 represents a heat radiating fin formed on the outer surface of the heat sink 140. An undescribed reference numeral 150 represents a circuitry received in the inner case 160.

Inner Case 160

FIG. 11 is a perspective view showing only an inner case shown in FIG. 9.

Referring to FIG. 11, the inner case 160 includes the receiver 161, the connection portion 162 and the level-difference portion 163. The receiver 161 has a cylindrical shape. The connection portion 162 is formed under the receiver 161 in such a manner as to have a diameter less than that of the receiver 161. The level-difference portion 163 connects the receiver 161 with the connection portion 162.

Here, the hook 164 is integrally formed on both sides of the outer surface of the receiver 161. Specifically, the hook 164 may be disposed on the lower portion of the outer surface of the receiver 161. However, the hook 164 may be disposed on the upper or central portion of the outer surface of the receiver 161 without being limited to this.

The hook 164 may be disposed in an opening 165 formed in the outer surface of the inner case 160. Specifically, the hook 164 may extend toward the opening 165 of the inner case 160. The hook 164 may project in such a manner that the end of the hook 164 is inclined.

When the inner case 160 is disposed within the lower portion of the heat sink 140, the hook 164 is coupled to the insertion recess formed within the heat sink 140. Therefore, the inner case 160 can be fixed to the heat sink 140 by the coupling of the hook 164 and the insertion recess.

The hook 164 formed on both sides of the outer surface of the inner case 160 is coupled to the insertion recess formed within the heat sink 140. Accordingly, it is possible to overcome defects caused by the destruction of a tap when a bolt is fastened to conventional power supply unit (PSU) housings of MR, PAR and a general bulb product and to overcome defects caused by crack.

First Modified Example of Inner Case

FIG. 12 is a perspective view showing a first modified example of the inner case shown in FIG. 11.

Referring to FIG. 12, like the inner case 160 shown in FIG. 11, an inner case 160' includes the receiver 161, the connection portion 162 and the level-difference portion 163. Here, the inner case 160' shown in FIG. 12 further includes a guide projection 167.

The guide projection 167 may project from the outer surface of the receiver 161 and may be formed in the longitudinal direction of the receiver 161.

The guide projection 167 may have a hemispherical shape. However, the guide projection 167 may have a polygonal shape including a triangular shape, a quadrangular shape and the like.

The guide projection 167 may be inserted into a guide groove (not shown) formed within the heat sink (see reference numeral 140 of FIG. 9) in a sliding manner. Here, the guide groove (not shown) of the heat sink 140 is formed at a position corresponding to the position of the guide projection 167 of the inner case 160'. The guide groove (not shown) of the heat sink 140 may have a shape corresponding to the shape of the guide projection 167 of the inner case 160'. As such, the guide projection 167 may function to indicate a direction in which the inner case 160' and the heat sink 140 are coupled to each other and where the inner case 160' and the heat sink 140 are coupled to each other.

When the guide projection 167 formed on the outer surface of the inner case 160' is inserted in a sliding manner into the guide groove (not shown) formed within the heat sink 140, the hook 164 formed on both sides of the outer surface of the inner case 160' is automatically coupled to the insertion recess formed within the heat sink 140. Accordingly, it is possible to overcome defects caused by the destruction of a tap when a bolt is fastened to conventional power supply unit (PSU) housings of MR, PAR and a general bulb product and to overcome defects caused by crack.

Second Modified Example of Inner Case

FIG. 13 is a perspective view showing a second modified example of the inner case shown in FIG. 11.

Referring to FIG. 13, like the inner case 160 shown in FIG. 11, an inner case 160" includes the receiver 161, the connection portion 162 and the level-difference portion 163. Here, the inner case 160" shown in FIG. 13 further includes a guide groove 167'.

The guide groove 167' may be formed toward the inside of the receiver 161 in the longitudinal direction of the receiver 161.

The guide groove 167' may have a hemispherical shape. However, the guide projection 167 may have a polygonal shape including a triangular shape, a quadrangular shape and the like.

The guide groove 167' may be inserted into a guide projection (not shown) formed within the heat sink (see reference numeral 140 of FIG. 9) in a sliding manner. Here, the guide projection (not shown) of the heat sink 140 is formed at a position corresponding to the position of the guide groove 167' of the inner case 160". The guide projection (not shown) of the heat sink 140 may have a shape corresponding to the shape of the guide groove 167' of the inner case 160". As such, the guide groove 167' may function to indicate a direction in which the inner case 160" and the heat sink 140 are coupled to each other and where the inner case 160" and the heat sink 140 are coupled to each other.

When the guide groove 167' formed on the outer surface of the inner case 160" is inserted in a sliding manner into the guide projection (not shown) formed within the heat sink 140, the hook 164 formed on both sides of the outer surface of the inner case 160" is automatically coupled to the insertion recess formed within the heat sink 140. Accordingly, it is possible to overcome defects caused by the destruction of a tap when a bolt is fastened to conventional power supply unit (PSU) housings of MR and PAR products and to overcome defects caused by crack.

Figure 14:
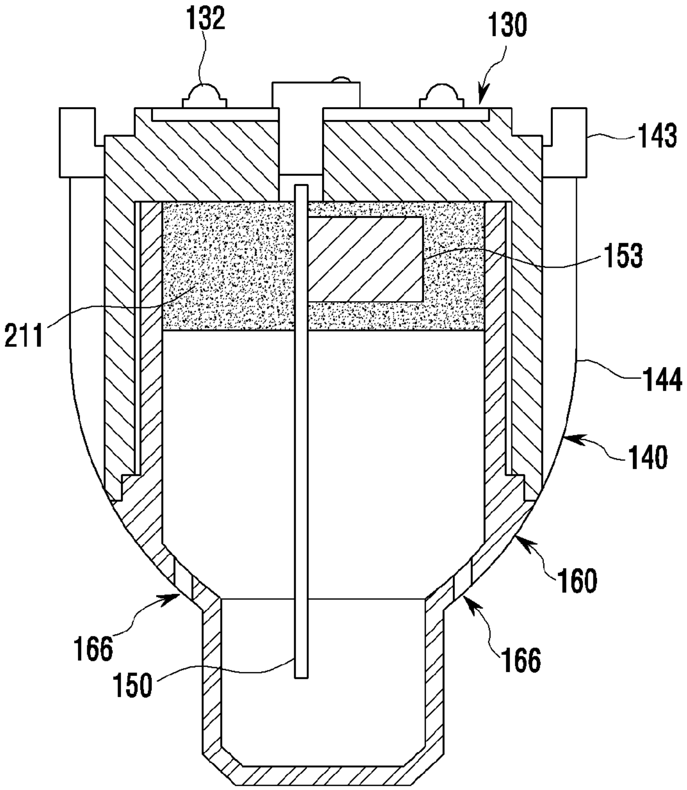
FIG. 14 is an inner cross sectional view of the lighting device according to the second embodiment shown in FIG. 9.
Figure 15:
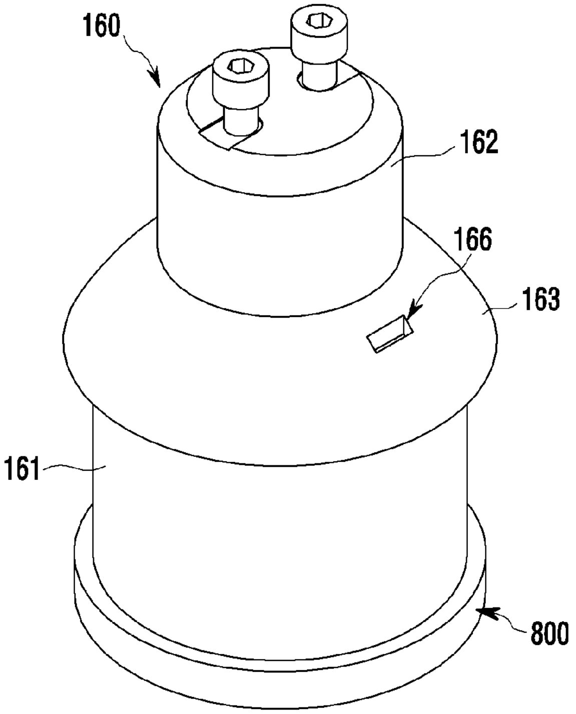
FIG. 15 is a perspective view of the inner case shown in FIG. 9 which is turned upside down.

FIG. 14 is an inner cross sectional view of the lighting device according to the second embodiment shown in FIG. 9. FIG. 15 is a perspective view of the inner case shown in FIG. 9 which is turned upside down.

Referring to FIGS. 9, 14 to 15, the inner case 160 includes an inlet 166. The inlet 166 is a hole for injecting molding liquid to heat generating parts received within the inner case 160. The inlet 166 may be formed in the level-difference portion 163.

The circuitry 150 is received within the inner case 160. Molding liquid 211 is cured and then disposed around the Converter 153 of the circuitry 150. Since the Converter 153 generates heat from the operation thereof, the molding liquid 211 surrounds the Converter 153 for the purpose of protecting other circuits from the generated heat and radiating the heat.

The Converter 153 may be an AC-DC converter which changes a value of alternating current voltage or a value of alternating current.

The molding liquid 211 is injected only around the internal heat generating parts, i.e., the Converter 153 through the inlet 166 formed in the inner case 160, and then is cured. Through this, a manufacturing cost can be reduced by reducing the amount of the molding liquid used.

More specifically, in the past, the molding liquid 211 was filled in the entire inside of the inner case 160 through the opening of the inner case 160. As a result, a molding process was also performed on portions requiring no molding liquid. However, in the embodiment, after a rubber cover 800 is coupled to the opening of the inner case 160, the molding liquid 211 is injected into only the Converter 153 through the inlet 166 and is cured, so that the amount of the molding liquid used can be reduced.

Figure 16:
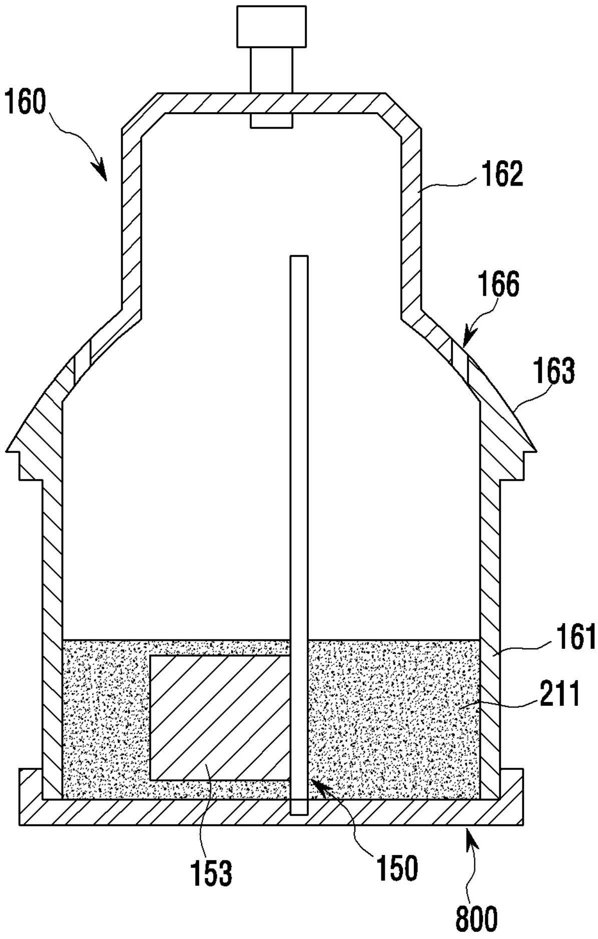
FIG. 16 is a cross sectional view showing that molding liquid is injected into heat generating parts of the circuitry through an inlet of the inner case.
Figure 17:
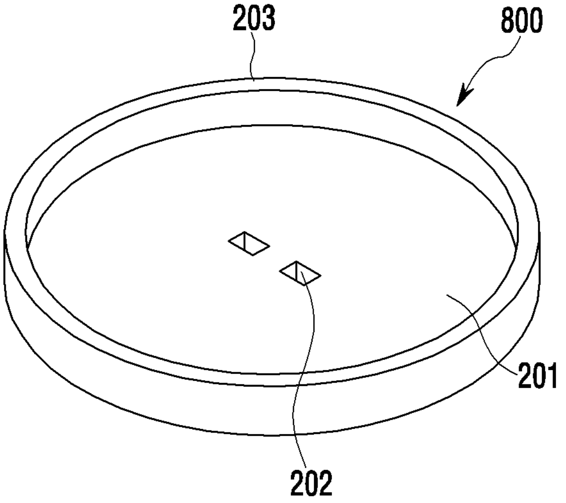
FIG. 17 is a perspective view of a rubber cover used to inject the molding liquid through the inlet of the inner case.

FIG. 16 is a cross sectional view showing that the molding liquid is injected into the heat generating parts of the circuitry through the inlet of the inner case. FIG. 17 is a perspective view of the rubber cover used to inject the molding liquid through the inlet of the inner case.

The inner case 160 includes the receiver 161, the connection portion 162 and the level-difference portion 163. Here, the level-difference portion 163 is an inclined portion. The inlet 166 is formed in the inclined portion 163.

The inlet 166 is formed in the inclined portion 163 of the inner case 160 so as to surround only the Converter 153 by the molding liquid 211. Further, for the sake of preventing the leakage of the molding liquid 211 being injected, the rubber cover 800 is provided in the opening of the receiver 161 of the inner case 160 in the form of JIG. After the molding liquid 211 is injected into the inner case 160 and is cured, the rubber cover 800 is removed.

The rubber cover 800 includes a flat portion 201 and a border wall 203. The flat portion 201 has a flat circular shape. The border wall 203 projects from the outer circumference of the flat portion 201 and is coupled to the outer surface of the receiver 161. A recess 202 is formed in the flat portion 201. When the rubber cover 200 is coupled to the opening of the receiver 161, the projecting portion of the circuitry 150 is inserted into the recess 202.

A method for injecting the molding liquid 211 into the inside of the inner case 160 by using the rubber cover 800 and the inner case 160 having the inlet 166 formed therein will be described.

First, the rubber cover 800 is coupled to the opening of the receiver 161 of the inner case 160. Then, the inner case 160 is installed such that the inlet 166 faces upward (see FIG. 16). Here, the heat generating parts received within the inner case 160, i.e., the Converter 153 is, as shown in FIG. 16, positioned in the lower portion of the inner case 160.

Then, the molding liquid 211 is injected through the inlet 166 of the inner case 160. Here, the molding liquid 211 is injected in such a manner as to sufficiently cover only the heat generating parts including the Converter 153, which are received within the inner case 160.

Lastly, the molding liquid 211 is cured and then the rubber cover 800 is removed.

In the foregoing molding method, after the molding liquid 211 injected through the inlet 166 is cured, the inlet 166 may be sealed by being molded with silicone or resin material.

As such, in the lighting device according to the second embodiment, the inlet 166 used to inject the molding liquid 211 into the inner case 160 is formed and the molding liquid is injected into only the heat generating parts. Through this, a manufacturing cost can be reduced. Also, the rubber cover 800 is provided in the form of JIG and removed after the molding liquid is cured. As a result, a manufacturing cost can be reduced by removing the parts.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A lighting device comprising:

a cover;

a member comprising a first placement portion, a second placement portion and a guide disposed between the first placement portion and the second placement portion;

a light source module disposed on the first placement portion;

a heat sink comprising a first receiver and a second receiver, the first receiver being defined by a flat surface and a plurality of heat radiating fins extending from an edge portion of the flat surface; and a circuitry disposed in the second receiver;

wherein the second placement portion is disposed in the first receiver, wherein a first portion of the guide is coupled to the cover and a second portion of the guide is coupled to the heat radiating fins of the heat sink, and wherein the guide is spaced apart from the flat surface, the guide contacts the heat radiating fins, and the guide is disposed on the heat radiating fins.

2. The lighting device of claim 1, further comprising:

a first terminal disposed at the second placement portion and electrically connected to the light source module; and a second terminal disposed at the flat surface to correspond to the first terminal and electrically connected to the circuitry.

3. The lighting device of claim 2, further comprising an insulating portion surrounding the first terminal, and wherein the insulating portion prevents electrical short-cut between the first terminal and the member.

4. The lighting device of claim 2, further comprising an insulating portion surrounding the second terminal, and wherein the insulating portion prevents electrical short-cut between the second terminal and the heat sink.

5. The lighting device of claim 2, wherein the first terminal comprises a circular first electrode and a second electrode surrounding the first electrode, wherein the second terminal includes a circular third electrode and a fourth electrode surrounding the third electrode, the circular third electrode and the fourth electrode provided at the flat surface, wherein the first electrode of the first terminal contacts the third electrode of the second terminal, and wherein the second electrode of the first terminal contacts the fourth electrode of the second terminal.

6. The lighting device of claim 1, wherein the light source module comprises a substrate and at least one light emitting device disposed on the substrate, and wherein the member has a cavity in which the substrate is disposed.

7. The lighting device of claim 1, wherein the heat sink has an insertion recess disposed in an inner surface of the second receiver, wherein the lighting device further comprising an inner case disposed in the second receiver of the heat sink, the inner case has a hook coupled to the insertion recess, and wherein the circuitry is disposed within the inner case and supplies electric power to the light source module.

8. The lighting device of claim 7, wherein the hook is disposed on two opposing sides of an outer surface of the inner case, respectively.

9. The lighting device of claim 7, wherein the inner case has an opening, and wherein the hook extends toward the opening and projects such that an end of the hook is inclined.

10. A lighting device comprising:

a cover;

a member comprising a first placement portion, a second placement portion and a guide disposed between the first placement portion and the second placement portion;

a light source module disposed on the first placement portion;

a heat sink comprising a first receiver and a second receiver, the first receiver being defined by a flat surface and a circumferential wall extending from an edge portion of the flat surface; and a circuitry disposed in the second receiver;

wherein the second placement portion is disposed in the first receiver, wherein a first portion of the guide is coupled to the cover and a second portion of the guide is coupled to the circumferential wall of the heat sink, and wherein the guide is spaced apart from the flat surface, the guide contacts the circumferential wall, and the guide is disposed on the circumferential wall.

11. The lighting device of claim 10, wherein the second placement portion has a screw thread, and wherein the circumferential wall has a screw recess coupled to the screw thread.

12. The lighting device of claim 10, wherein the second portion of the guide has a catching projection, and wherein the circumferential wall has a catching recess coupled to the catching projection.

13. The lighting device of claim 10, wherein the second placement portion has a catching projection, wherein the circumferential wall has a catching recess coupled to the catching projection, and wherein the catching recess is bent in the form of "L".

14. The lighting device of claim 10, further comprising:

a first terminal disposed at the second placement portion and electrically connected to the light source module; and a second terminal disposed at the flat surface to correspond to the first terminal and electrically connected to the circuitry.

15. The lighting device of claim 10, wherein the light source module comprises a substrate and at least one light emitting device disposed on the substrate, and wherein the member has a cavity in which the substrate is disposed.

16. The lighting device of claim 10, wherein the heat sink has an insertion recess disposed in an inner surface of the second receiver, wherein the lighting device further comprising an inner case disposed in the second receiver of the heat sink, the inner case has a hook coupled to the insertion recess, and wherein the circuitry is disposed within the inner case and supplies electric power to the light source module.

17. The lighting device of claim 16, wherein the inner case has an opening, and wherein the hook extends toward the opening and projects such that an end of the hook is inclined.

18. A lighting device comprising:

a light source module;

a heat sink in which the light source module is disposed and that has a receiver;

an inner case disposed in the receiver of the heat sink and has at least one inlet for injecting molding liquid, wherein the inner case includes:

a cylindrical receiver, a connection portion disposed under the cylindrical receiver and to have a diameter less than a diameter of the cylindrical receiver, and an inclined portion to connect the cylindrical receiver with the connection portion;

a circuitry disposed within the inner case, the circuitry supplies electric power to the light source module, and the circuitry includes at least one heat generating part; and a molding part disposed in a first portion of an inside of the inner case, and a second portion being a remaining portion of the inside of the inner case, the second portion is not filled with the molding part, wherein the heat generating part of the circuitry is disposed in the first portion of the inside of the inner case, and wherein the inlet for injecting molding liquid is provided at the inclined portion and at the second portion.

19. The lighting device of claim 18, wherein the inlet is sealed with silicone or resin material.

20. The lighting device of claim 18, wherein the heat sink has an insertion recess, and wherein the inner case has a hook coupled to the insertion recess.

* * * * *